(12) United States Patent
Bongio Karrman et al.

(10) Patent No.: US 11,520,037 B2
(45) Date of Patent: Dec. 6, 2022

(54) PERCEPTION SYSTEM

(71) Applicant: Zoox, Inc., Foster City, CA (US)

(72) Inventors: Anton Mario Bongio Karrman, Foster City, CA (US); Cooper Stokes Sloan, San Francisco, CA (US); Chuang Wang, Sunnyvale, CA (US); Joshua Kriser Cohen, Sunnyvale, CA (US); Yassen Ivanchev Dobrev, Foster City, CA (US); Jifei Qian, Campbell, CA (US)

(73) Assignee: Zoox, Inc., Foster City, CA (US)

( * ) Notice: Subject to any disclaimer, the term of this patent is extended or adjusted under 35 U.S.C. 154(b) by 586 days.

(21) Appl. No.: 16/587,605

(22) Filed: Sep. 30, 2019

(65) Prior Publication Data

US 2021/0096241 A1 Apr. 1, 2021

(51) Int. Cl.
| | |
|---|---|
| *G01S 13/931* | (2020.01) |
| *G01S 7/41* | (2006.01) |
| *G01S 13/42* | (2006.01) |
| *G05D 1/00* | (2006.01) |
| *G05D 1/02* | (2020.01) |

(Continued)

(52) U.S. Cl.
CPC ............ *G01S 13/931* (2013.01); *G01S 7/417* (2013.01); *G01S 13/42* (2013.01); *G05D 1/0088* (2013.01); *G05D 1/0257* (2013.01); *G06N 3/04* (2013.01); *G06N 3/08* (2013.01)

(58) Field of Classification Search
CPC .... G05D 1/0088; G05D 1/0257; G01S 13/42; G01S 13/931; G01S 15/931; G01S 17/931; G01S 7/417; G06K 9/6271; G06N 3/04; G06N 3/08; G06V 10/82; G06V 20/58; G06V 20/70
See application file for complete search history.

(56) References Cited

U.S. PATENT DOCUMENTS

| | | | | |
|---|---|---|---|---|
| 9,858,640 | B1 * | 1/2018 | Earl | .......................... G06T 11/60 |
| 10,169,680 | B1 * | 1/2019 | Sachdeva | ................ G06T 15/30 |

(Continued)

FOREIGN PATENT DOCUMENTS

EP 2090899 A2 8/2009

OTHER PUBLICATIONS

Danzer, et. al., "2D Car Detection in Radar Data with PointNets", Cornell University Library, Apr. 17, 2019, 7 pages.

(Continued)

*Primary Examiner* — Timothy X Pham
(74) *Attorney, Agent, or Firm* — Lee & Hayes, P.C.

(57) ABSTRACT

Techniques for updating data operations in a perception system are discussed herein. A vehicle may use a perception system to capture data about an environment proximate to the vehicle. The perception system may receive state data stored in cyclic buffer of globally registered detection and occasionally converted to gridded point cloud in a local reference frame. The two-dimensional gridded point cloud may be processed using one or more neural networks to generate semantic data associated with a scene or physical environment surrounding the vehicle such that the vehicle can make environment aware operational decisions, which may improve reaction time(s) and/or safety outcomes of the autonomous vehicle.

20 Claims, 6 Drawing Sheets

(51) Int. Cl.
  *G06N 3/04*   (2006.01)
  *G06N 3/08*   (2006.01)

(56) References Cited

U.S. PATENT DOCUMENTS

2018/0107215 A1* 4/2018 Djuric ................. G05D 1/0088
2018/0349746 A1* 12/2018 Vallespi-Gonzalez ......................
                                                       G06V 20/58

OTHER PUBLICATIONS

The International Preliminary Report on Patentability for PCT Application No. PCT/US20/51777, dated Apr. 14, 2022.
The PCT Search Report and Written Opinion dated Dec. 16, 2020 for PCT application No. PCT/US20/51777, 19 pages.

* cited by examiner

PERCEPTION SYSTEM

BACKGROUND

A navigation system for an autonomous vehicle often includes a conventional perception system, which utilizes a variety of data from sensors on board the autonomous vehicle. The conventional perception system allows the autonomous vehicle to recognize objects in the physical environment so that the autonomous vehicle can plan a safe route through the environment. The safe operation of an autonomous vehicle depends at least in part on information made available by the conventional perception system in detecting, classifying, and predicting motion of objects. However, conventional perception systems may depend heavily on image data, which can require additional processing and ultimately delay decision making. This shortcoming may be significant in view of objects, such as vehicles, that change their trajectory in a relatively short span of time. Thus, improved processing speeds and reduced latency associated with perception systems that rely on different types of sensor data may improve the operational safety of autonomous vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
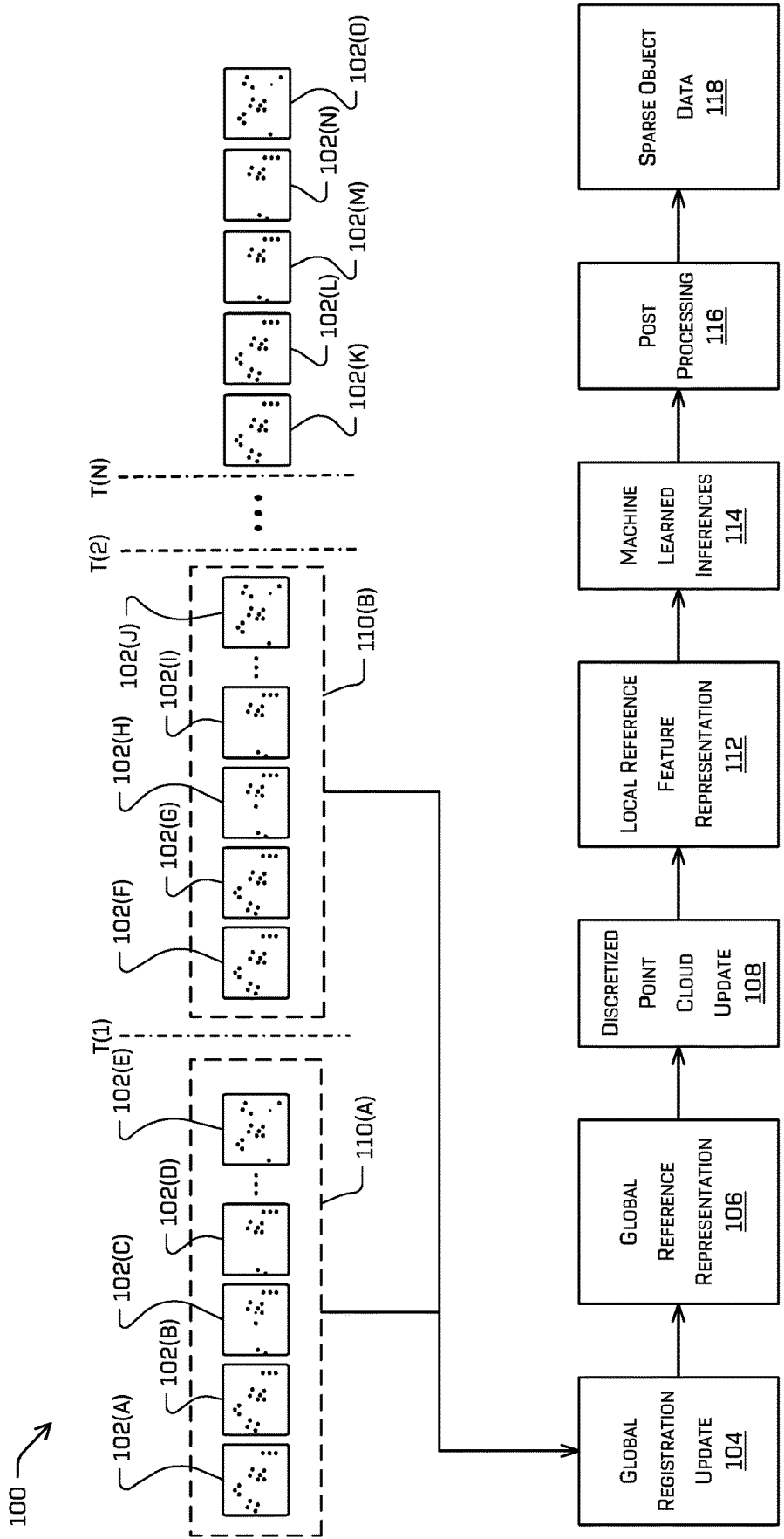
FIG. 1 is a process flow diagram illustrating an example data flow of a perception system, as described herein.

Techniques described herein are directed to a perception system which may include a radar-based perception system. In some examples, the radar-based perception system can be implemented in a system such as a vehicle or an autonomous vehicle. In general, autonomous systems, such as vehicles, often use a perception system processing various types of sensor data to identify objects and predict trajectories of those objects in order to safely navigate around the objects and, thereby, avoid collisions. The radar-based perception system, described herein, may be implemented using radar data in lieu of or in addition to other types of sensor data, such as image data and/or lidar data, in such a manner to reduce latency associated with sensor data used to make critical navigation decisions. For instance, using a radar-based perception system reduces the perception system's reliance on environmental illumination as the radar sensors emit illumination, thereby improving the system's performance in unlighted or low-light environments. Use of the radar-based perception system may also allow for improved performance in the case of degraded environments (e.g., foggy, rainy, snowy, etc.) due to the long wavelength of the radar when compared to other types of sensor systems. The radar-based perception system also produces improved accuracy with respect to determining the range rate or relative velocity of objects detected in the scene compared to other sensor technologies due to the radar being phase coherent.

In some examples, the perception system may perform updates on object state data, such as position, orientation, velocity, historical state, semantic information, etc., using a discretized point cloud representation of captured radar and machine learned algorithms (such as deep neural networks) outside of and in addition to more traditional perception pipelines. In some implementations, the radar-based perception system may utilize a top-down or two-dimensional machine learned radar perception update process. For instance, the radar-based perception system may receive radar-based point cloud data from one or more sensors positioned on the vehicle and convert the raw radar-based point cloud data into object level representations that may be processed or utilized by a planning and/or prediction system of the vehicle in making operational decisions for the vehicle. In one specific example, the radar-based perception system may convert the radar-based point cloud data (which may represent at least three dimensions) into a point cloud representation (also referred to generally as a discretized data representation) usable for feature extraction and/or instance detection. The discretized data representation may represent three-dimensional data in a two-dimensional manner. In some examples, the three-dimensional data can be associated with a discretized region of an environment (e.g., a portion of a grid) whereby the three-dimensional data can be collapsed or otherwise represented in a two-dimensional manner. In some examples, such a two-dimensional representation may be referred to as a top-down representation. In some examples, a top-down or two-dimensional discretized data representations may store detections represented in the radar-based point cloud data as vectors, pillars, or collections. In some cases, a top-down representation may include a two-dimensional "image" of an environment, whereby each pixel of the image may represent a grid location (or other discretized region) that has a fixed size, while in other cases, the grid locations or discretized regions may be associated with variable number of points. In the cases, where a variable size bin is used, the radar-based perception system may also limit or include a maximum bin size that may operate in the manner of a cyclic buffer.

In some implementations, such as when memory is a concern, the bins may represent multiple pixels to reduce the overall size of the grid. In another example, each bin may be configured to store a sparse point representation or sparse feature map of the radar-based point cloud data associated therewith. In some cases, the techniques may include applying a machine learned model (e.g., a trained deep neural network or convolutional neural network) to the point cloud representation to identify one or more objects and/or instances within the radar-based point cloud data that may be used by the planning and/or prediction systems. In some cases, the output of the deep neural network may be an object bounding box, an occupancy value, and/or state of the object (e.g., trajectory, acceleration, speed, size, current physical position, object classification, instance segmentation, etc.).

In some examples, a machine learning model (e.g., deep neural network or convolutional neural network) may be trained to output semantic information and/or state information by reviewing data logs to identify sensor data representing objects in an environment. In some cases, the objects can be identified, and attributes can be determined for the object (e.g., a pedestrian, a vehicle, a bicyclist, etc.) and the environment, and data representing the objects can be identified as training data. The training data can be input to a machine learning model where a known result (e.g., a ground truth, such as a known bounding box, velocity information, pose information, classification, etc.) can be used to adjust weights and/or parameters of the machine learning model to minimize a loss or error. In some examples training may be performed in a supervised manner (e.g., where ground truth is determined based at least in part on human annotations or from other perception models), an unsupervised manner (e.g., where a training data set does not include annotations), a self-supervised manner (e.g., where ground truth is determined based at least in part from prior generated models), and/or a semi-supervised manner using a combination of techniques.

In some particular implementations, the perception system may utilize one or more global registration updates (e.g., association of the newly acquired radar data in a global reference frame and stored) followed by a discretized point cloud update. The global registration update may be configured to perform a registration on the radar-based point cloud stream that both projects and registers the radar-based point cloud stream using a global reference frame. For example, the global registration update may process for each interval of radar data received from the sensors. Thus, the global registration update may be performed multiple times for each iteration of the discretized point cloud update. In the global reference framed representation, the radar data of the radar-based point cloud stream may be sparsely stored in a cyclic buffer.

The discretized point cloud update may in some cases be dynamically initiated based on a trigger or criteria being met or exceed. For example, the discretized point cloud update may commence based on a time period elapsing, a predetermined number of global registration updates completing, a predetermined number of points being registered using the global reference frame, among others. Upon initiation, the discretized point cloud update may utilize the registered points (e.g., the points within the global reference framed representation) to generate the point cloud representation. In some cases, the point cloud representation may be a two-dimensional or top down grid including a plurality of discretized regions or grid locations. In one example, the discretized point cloud update may convert the global reference framed representation stored in the cyclic buffer into a point cloud representation having a local reference. As an illustrative example, the perception system may utilize platform state information and/or data associated with the point in the global reference frame representation to re-project the points positioned to reflect a local reference frame (such as the position, velocity, direction, etc. of the vehicle) and assign each point to a discretized region or grid location associated with the points position within the local reference frame. For example, in one implementation, the system may perform a positional transform (such as position subjection based on a position of the vehicle relative to the global reference frame) and a rotation (based on the yaw of the vehicle relative to the global reference frame) on the individual points to convert the points to the local reference frame.

The discretized point cloud update may apply a multi-layer perceptron and/or a point-wise pooling operation applied to each of the points within the local reference point cloud. In one instance, the multi-layer perceptron process may extract a feature vector per point. For example, the multi-layer perceptron may be trained with Stochastic Gradient Descent, for example, as part of the entire architecture in an end-to-end process that is based on multiple loss functions including a classification loss and a bounding box regression loss. In some cases, the multi-layer perceptron may include one or more deep networks.

Thus, if a discretized region or bin is associated with or stores ten points, the multi-layer perceptron process will generate ten feature vectors associated with that discretized region or bin. The result is a grid in which each bin has a different number or variable number of features or vectors.

In some cases, the pooling operations may include a statistical summary over the feature vectors of each bin. For instance, the pooling operation may be a max pooling operation in which a maximum value associated with a feature of the feature vectors associated with a bin is selected to represent the bin. In some cases, the pooling operation may be performed per feature value when each feature vector includes multiple values. It should be understood that in other implementations, various types of pooling operations may be used, such as average pooling, minimum pooling, etc. In some cases, the pooling operation may be selected to result in permutation invariance within the feature vectors.

A machine learned model, such as a neural network, may extract features from the local reference feature representation and map the features to semantic representation. For example, a machine learned model may comprise a network that maps objects from pixel to pixel within the grid. In one specific instance, a u-net architecture may be implemented. A u-net architecture is a convolutional neural network that can be used for image segmentation based on detecting valid parts of each convolution without relying on any fully connected layers. It should be understood that, in other example, other types of neural networks may be used, such as dilated convolutions. In some examples, features used during learning may include range rate, age of associated radar data, and position, while learned outputs include direction to object centers or semantic class information. In one specific example, the features may include an offset time representative of the latency associated with the system to assist in predicting object data (e.g., position, velocity, direction of travel) at the time operational decisions are being made by the vehicle. In some instances, the offset time may be between approximately one millisecond and approximately ten milliseconds.

The feature vectors of the semantic state-based representation may be converted to object data (such as via a sparse state representation) that may be used to track objects through a scene and/or output to a planning and/or prediction system. For instance, the perception system may apply a per pixel class estimation to each of the bins to identify a class of the object as well as instance segmentation to determine a center of an object (e.g., a physical position) and/or if two pixels or bins are associated with the same object.

The perception system may also, in some implementations, perform post processing on the dense grid to generate a sparse object representation that may be used in object tracking. In one specific example, the perception system may apply a non-maximum suppression technique to convert the grid into a sparse object representation.

The techniques discussed herein can improve a functioning of a computing device in a number of additional ways. In some cases, utilizing a perception system, described herein, is configured to reduce the overall delay caused by preprocessing of sensor data, more accurately predict object velocity, and improve the accuracy of object detection in poorly lighted or degraded environment. In this manner, the system is able to provide an output to a prediction and/or planning system more representative of the real-life/real-time physical environment, thereby improving overall safety of the autonomous vehicle. It should be understood, that in some examples, the perception system may be used in combination with other perceptions systems that rely on image data, lidar data, as well as other types of sensor data.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers and/or a system to implement emergency maneuvers, such as emergency braking. In another example, the techniques can be utilized in an aviation or nautical context. Additionally, the techniques described herein can be used with real data (e.g., captured using sensor(s)), simulated data (e.g., generated by a simulator), or any combination of the two.

FIG. 1 is a process flow diagram illustrating an example flow 100 of a perception system, as described herein. In the illustrated example, radar data 102(A)-(O) representative of a physical environment may be captured by one or more sensors. In some cases, the radar data 102 may be captured based on a time interval associated with a speed of the sensor collecting the radar data 102. In these cases, each of the radar data 102(A)-(O) may represent the radar data 102 collected during one such time interval.

For each interval of radar data 102(A)-(O) captured by the one or more sensors, the perception system may perform a global registration update 104. The global registration update 104 may register the radar-based point cloud stream using the platform's state in the global reference frame to generate a global reference representation 106 of the radar data 102(A)-(O). For example, the global registration update 104 may project each point represented in the radar data 102(A)-(O) into a space having the global reference.

In some cases, the global registration update 104 may process multiple iterations prior to the system preforming or initiating the discretized point cloud update 108. For instance, in the illustrated example, the global registration update 104 may process once for each interval of radar data 102(A)-(E) prior to the commencement of the discretized point cloud update 108. Thus, as shown, the intervals of radar data 102(A)-(E), generally indicated by 110(A), may comprise data utilized by the global registration update 104 to generate a first instance of the global reference representation 106 that is used as an input to the discretized point cloud update 108. Similarly, the intervals of radar data 102(F)-(J), generally indicated by 110(B), may comprise data utilized by the global registration update 104 to generate a second instance of the global reference representation 106 that is used as a second input to the discretized point cloud update 108. In the current example, the discretized point cloud update 108 may be run based on a number of intervals of the radar data 102 being captured (e.g., every 5 intervals, 6 intervals, 10 intervals, etc.), however, it should be understood that various types of criteria or threshold may be utilized to trigger or initiate the discretized point cloud update 108.

The discretized point cloud update 108 may convert the global referenced representation of the radar data 102 to a point cloud representation having a local reference frame. For example, in one implementation, the discretized point cloud update 108 may perform a positional transform and a rotation (e.g., position subjection) on the individual points to convert the points from the global reference frame to the local reference frame.

The discretized point cloud update 108 may also apply multi-layer perceptron to each of point within the global reference representation 106. In one instance, the multi-layer perceptron process may extract a feature vector per point to generate a two-dimensional grid in which discretized region or grid location has a variable number of features or vectors. In some specific examples, the two-dimensional top down grid may be in the form of a 256 by 256 grid, 512 by 512 grid, or a 512 by 256 grid. In other examples, the dimensions of the grid may be variable or based on the size of a memory buffer associated with storing the point cloud representation. In still other examples, the grid may be based on the type of vehicle, the policy of the vehicle (e.g., the grid is extended in the direction of travel), based on the range of the radar sensors, among others. In some examples, each discretized region or grid location may represent in the range of ⅛ of a meter to ¼ of a meter in the physical environment, resulting in a grid covering an area of approximately 32 meters to approximately 128 meters depending on the size of the grid. However, it should be understood, that various physical sizes may be assigned to the discretized region or grid location, for instance, based on a size of the grid, size of the physical environment being covered, and variable memory. Thus, each point detected within the ⅛ of a meter represented by a discretized region or grid location is assigned to that discretized region or grid location.

The discretized point cloud update 108 may then apply one or more pooling operations to the two-dimensional grid. For instance, the discretized point cloud update 108 may include a statistical summary over the feature vectors of each discretized region to generate a local referenced feature representation 112 of the radar data 102.

In some implementations, the perception system may determine machine learned inferences 114 from the local referenced feature representation 112. In one example, the machine learned inferences 114 may include utilizing one or more neural networks to extract features from the local reference feature representation 112 and map the features to semantic state-based representation. For example, the application of the neural networks may be a network that maps objects from pixel to pixel within the grid.

The perception system may also perform post processing 116 prior to outputting to a prediction and/or planning system. For example, the post processing 116 may include converting feature vectors of the semantic state-based point cloud representation into sparse object data 118 (such as via a sparse state representation) that may be used to track objects through a scene and output to a planning and/or prediction system. In one example, the post processing 116 may include a per pixel class estimation to each of the discretized regions or bins to identify a class of the object as well as instance segmentation to determine a center of an object (e.g., a physical position) and/or if two pixels or bins are associated with the same object.

Figure 2:
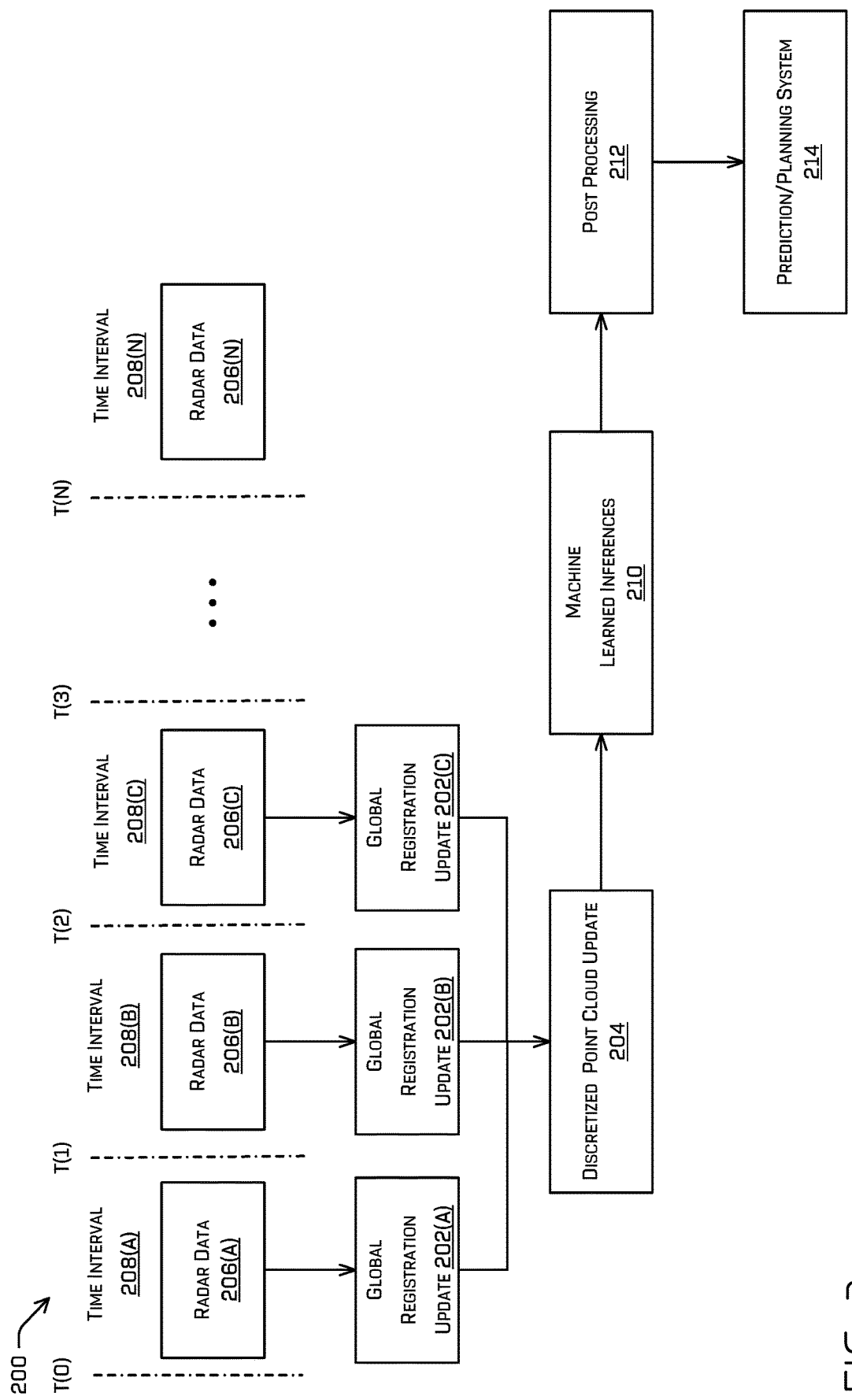
FIG. 2 is a timing diagram illustrating an example data flow of the perception system, as described herein.

FIG. 2 is a timing diagram illustrating an example data flow 200 of the perception system, as described herein.

Similar, to the flow 100 of FIG. 1, in the current example, the perception system may perform multiple global registration update, illustrated as updates 202(A)-(C), per discretized point cloud update 204. For instance, as illustrated, one or more sensors may capture radar data, such as radar data 206(A)-(C), during an associated time interval 208(A)-(C). For each interval of radar data 206(A)-(C) captured, the system may perform the corresponding global registration update 202(A)-(C). During each of the corresponding global registration update 202(A)-(C), the system may update or incorporate the corresponding radar data 206(A)-(C) into a shared global referenced representation.

As discussed above, the discretized point cloud update 204 may convert the global referenced representation to a point cloud representation having a local reference frame. For example, the discretized point cloud update 204 may perform a position subtraction (translation) and/or a rotation for each point based on the vehicle's position relative to the global reference frame to convert the points from the global referenced representation to the local referenced representation.

Additionally, the discretized point cloud update 204 may apply multi-layer perceptron to extract at least one feature vector per point to generate a local referenced two-dimensional grid in which a discretized region or bin has a variable number of features or vectors. The discretized point cloud update 204 may then apply one or more pooling operations to the two-dimensional grid to generate a local referenced point cloud representation of the radar data 206(A)-(C) in which each discretized region or bin has a single feature vector representative of the points within the discretized region or bin. In some cases, the two-dimensional grid may be a series of point pillars, in which each point is a discretized region and each pillar is a feature vector. It should be understood that while the pooling operation may reduce the number of feature vectors within a discretized region or bin to one, that the size or length of the feature vector may vary from discretized region to discretized region (e.g., grid location to grid location) based at least in part on a number and/or type of features detected at each discretized region.

The perception system may determine machine learned inferences 210 from the local referenced point cloud representation. In one example, the post processing 212 may include utilizing machine learning, such as one or more neural networks, to extract features from the local reference feature representation and map the features to two-dimensional semantic representation. For example, the application of the one or more neural networks may be a network that maps objects from pixel to pixel (or grid location to grid location) within the grid.

The perception system may also perform post processing 212 on a two-dimensional semantic representation to generate object and/or state data (which may be maintained in a sparse object state representation) prior to outputting to a prediction system 214. The prediction/planning system 214 may then utilize the output of the perception system to make operational decisions for the autonomous vehicle.

Figure 3:
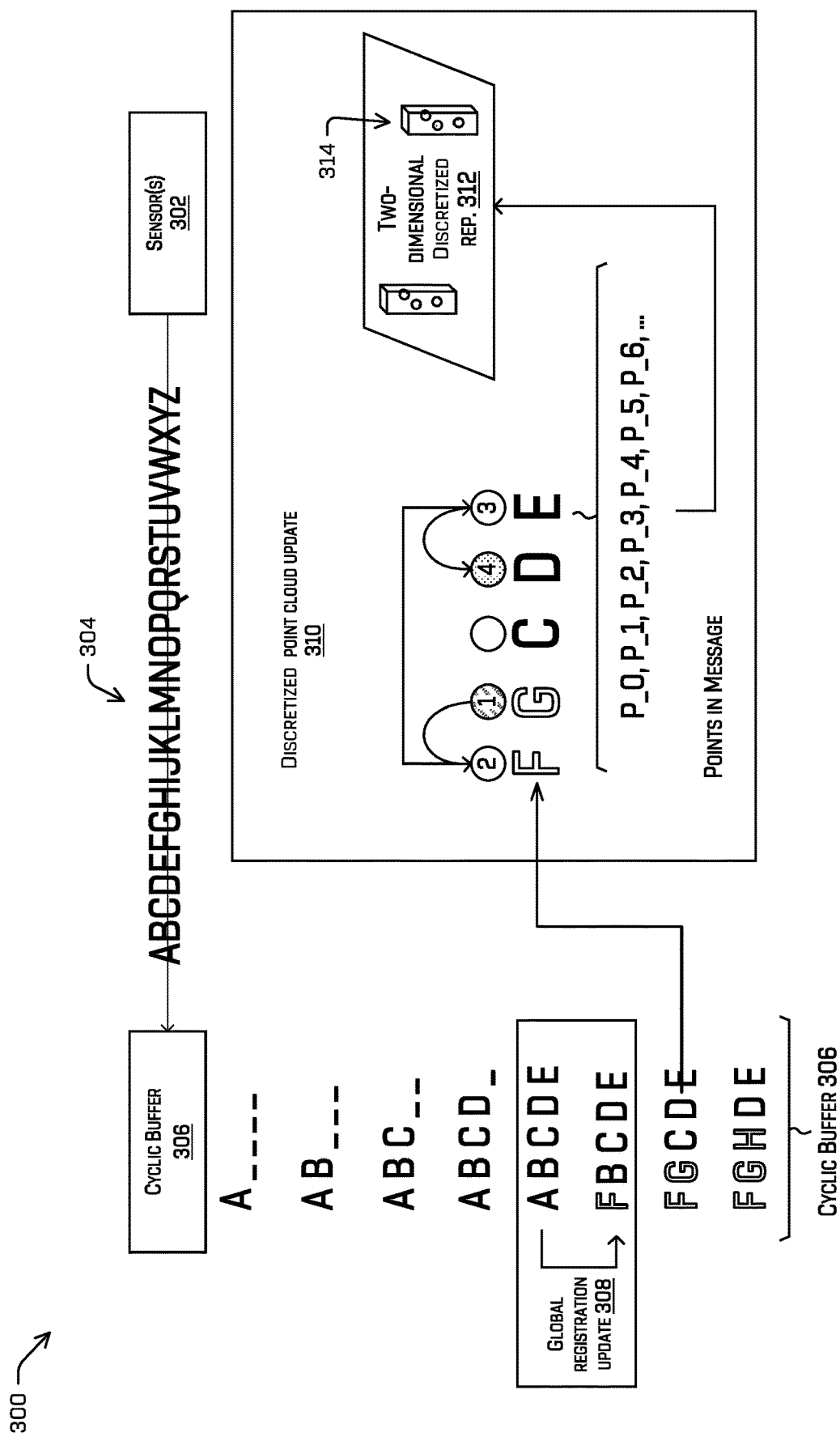
FIG. 3 is a pictorial diagram illustrating an example architecture of the perception system, as described herein.

FIG. 3 is a pictorial diagram illustrating an example architecture 300 of the radar-based perception system, as described herein. As discussed above, one or more sensors 302 may capture data 304 (such as radar data) from an environment surrounding a platform (such as an autonomous vehicle). The sensor data 304 may then be provided as a stream of data to a cyclic buffer 306. In other examples, other buffer configuration may be used such as a ring type buffer or a first in first out buffer. In some cases, the cyclic buffer 306 may be a data structure that has a fixed-size buffer (in this particular example, a size of 5) that is connected end-to-end such that new data added to the buffer 306 replaces the oldest data. As illustrated, the data A, B, C, D, and E has already been added to the cyclic buffer 306 and the buffer 306 is receiving data F.

As part of the global registration update 308, the data F is registered to a global reference frame as data F is added to the cyclic buffer 306. In this example, since the buffer 306 is full (e.g., already holds 5 elements), the global registration update 308 may overwrite data A from the buffer (as data A is the oldest) with data F. In this manner, the perception system is able to maintain the most recent data 304 captured by the sensors 302 when performing the discretized point cloud update 310 to ensure that platform makes operational decisions based on the most up-to-date sensor data 304. In the current example, the perception system also receives data G and performs a second global registration update 308 to register data G as well as to replace data B (the new oldest data) with data G.

In the illustrated example, the discretized point cloud update 310 may receive the contents from the cyclic buffer 306, as shown data FGCDE, as an input. In some cases, the discretized point cloud update 310 may be dynamically initiated based on one or more criteria being met or exceeded. In other cases, the discretized point cloud update 310 may be periodic or based on a state of the data stored in cyclic buffer 306. In some cases, the discretized point cloud update 310 may be configured to process a predetermined number of entries in the cyclic buffer 306. For instance, in this example, the discretized point cloud update 310 may be set to process four entries in the cyclic buffer 306 (e.g., one less than the size of the cyclic buffer 306).

In this example, the discretized point cloud update 310 may initiate from the newest or most recently added data to the cyclic buffer 306. Thus, the discretized point cloud update 310 may first add data G to the two-dimensional discretized representation 312 of the data 304. Following data G, the discretized point cloud update 310 may then add data F, E, and D to the two-dimensional discretized representation 312 of the data 304. As discussed above, the two-dimensional discretized representation may include discretized regions associated with multiple points of the data G, F, D, and E. Thus, as illustrated, a discretized region, such as location 314, may form a point pillar or collection of points. In some cases, as part of the discretized point cloud update 310 each point may have an associated feature vector having values associated with characteristics of the point. The two-dimensional discretized representation 312 of the data 304 may then be output for processing by a neural network or other learned inference technique, such as extracting semantic information and determining objects, prior to being provided to a planning or prediction system.

Figure 4:
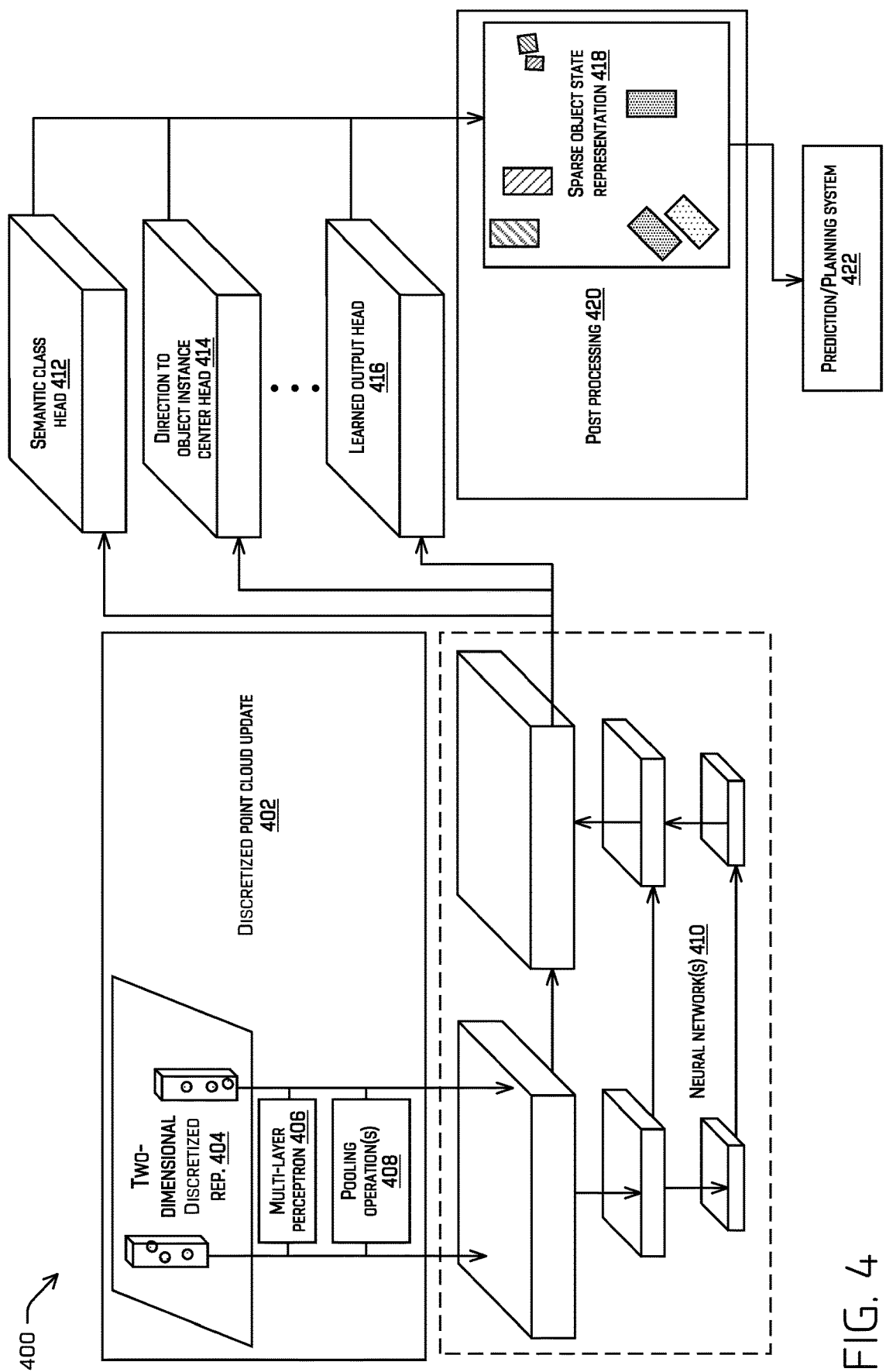
FIG. 4 is another pictorial diagram illustrating an example architecture of the perception system, as described herein.

FIG. 4 is another pictorial diagram illustrating an example architecture 400 of the radar-based perception system, as described herein. As discussed above, the system may perform a discretized point cloud update 402 to generate two-dimensional discretized representation 404. As part of the discretized point cloud update 402 and in addition to converting the points to a local reference frame (via one or more translations and/or rotations), the discretized point cloud update 402 may include applying multi-layer perceptron process 406 and/or one or more pooling operations 408 to the points associated with the two-dimensional discretized representation 404.

The multi-layer perceptron process 406 may extract a feature vector per point. Thus, if a discretized region (e.g., a grid location or region associated with a discretized representation of the environment) is associated with multiple points, the multi-layer perceptron process 406 may generate a feature vector for each of the points associated with that discretized region. The result is a grid in which each bin has a different number or variable number of features or vectors. The pooling operations 408 may apply a statistical summary over the feature vectors of each bin. For instance, the pooling operation 408 may apply a max pooling operation in which a maximum value associated with a feature of the feature vectors associated with a region is selected to represent the region, though any other pooling operation is contemplated (e.g., average, min, etc.). In this manner, each discretized region may be represented using a single feature vector. Alternatively, in other implementations, various other types of pooling operations may be used provided that the pooling operation selected introduces permutation invariance into the resulting feature vectors.

In the illustrated example, once the pooling operation 408 is complete, the perception system may utilize one or more neural networks 410 (such as via a U-Net architecture) to extract deep convolutional features from the feature vectors of the two-dimensional discretized point cloud representation 404.

For instance, the one or more neural networks 410 may generate any number of learned inference or heads, such as semantic class head 412, direction to object instance center head 414, as well as other learned output heads 416 (such as target extent, target azimuth, target velocity, object boundary box, etc.). In some cases, the neural network may be a trained network architecture that is end-to-end, with Stochastic Gradient Descent. For instance, object annotations in the global frame are registered to the local frame to provide supervised maps that may be used as ground truth targets for various network outputs or heads, such as heads 412-416. Specifically, appropriate truth outputs in the form of image maps may include semantic per-pixel classification (bike, pedestrian, vehicle), instance segmentation via regression to vectors that point toward object centers, and bounding box representations (yaw and extent information). The loss functions used may take advantage of homoscedasticity and/or heteroscedasticity; typical loss functions include mean square and mean absolute error as well as categorical cross entropy (including focal loss penalties that more disproportionately penalize rare cases to compensate for unbalanced data).

In the illustrated example, the semantic class estimation head 412 may include segmenting and/or classifying the extracted deep convolutional features into semantic data (e.g., velocity, class or type, direction of travel, etc.). The process to determine the direction to object instance center head 414 may be configured to predict a vector from the point to the center of the target. For instance, this feature may be learned via a supervised method that trains a deep network to regress to vectors (an x and y value, per-pixel) that point to the center of a true object's bounding box representation when the pixel is within the bounds of the object's box. Further as part of the learned inferences, the system may perform segmentation using the per discretized region vector field to disambiguate which pixels or points belong to which object and convert the pixels or points to a sparse object representation.

A sparse object state representation 418 of the physical environment may result from the various heads, including the heads 412-416. Post processing 420 may then be performed on the sparse object state representation 418 to generate object data that may then be output to a prediction/planning system 422 for use in making operational decisions for the platform or autonomous vehicle. For example, the post processing 420 may include nonmaximal suppression, thresholding, Hough voting, connected components, and/or morphological operations, among others.

Figure 5:
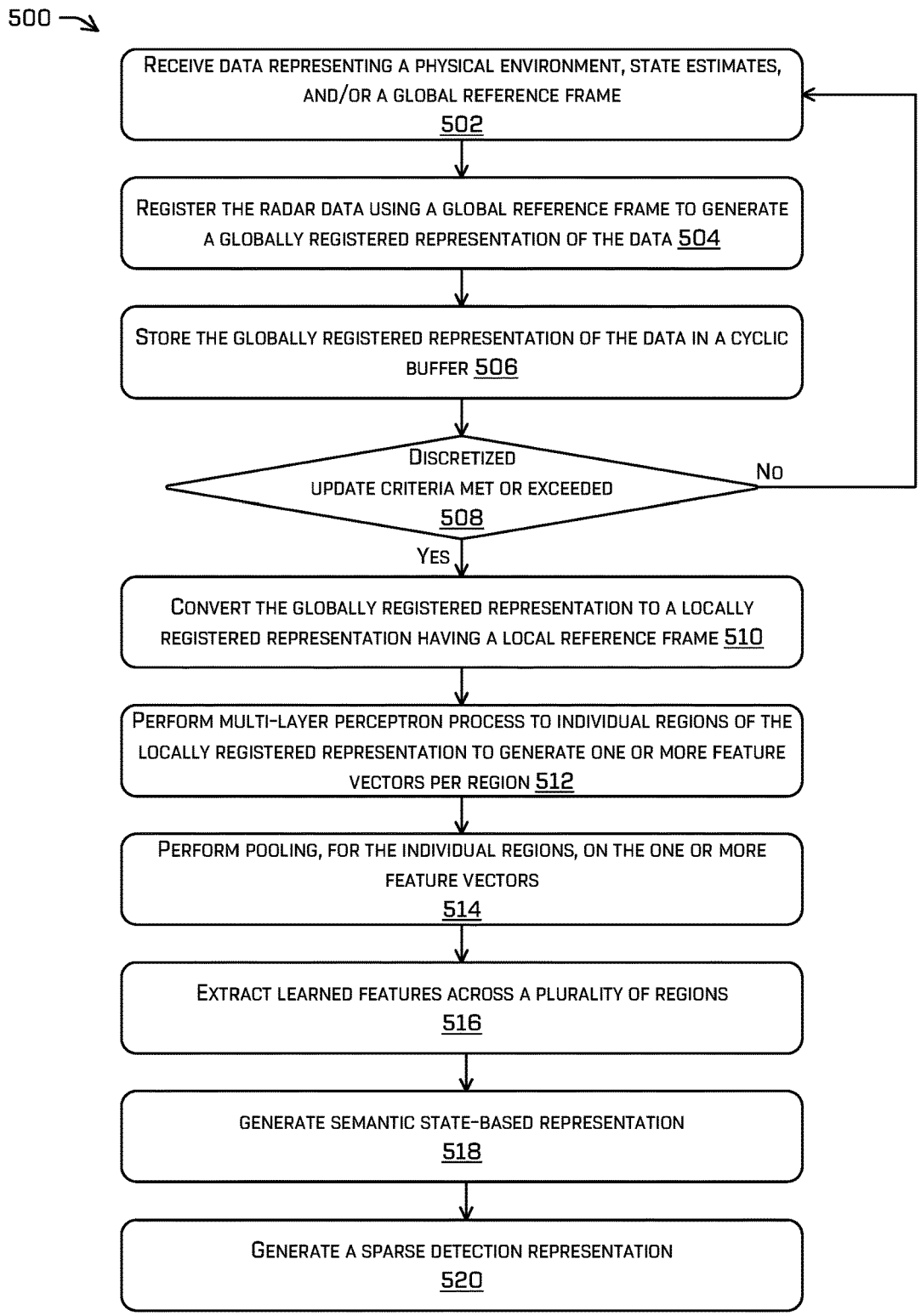
FIG. 5 is a flow diagram illustrating an example process of a perception system for generating object perception tracks, as described herein.

FIG. 5 is a flow diagram illustrating an example process 500 of the radar-based perception system for generating object perception tracks, as described herein. The process is illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

At 502, the radar-based perception system receives radar data representing a physical environment, platform state estimates, and/or a global reference frame. The radar data may be captured by one or more sensors physically located at one or more position of an autonomous vehicle. The radar data may be captured over a time interval. In some cases, the time interval may be based on one or more characteristic of the one or more sensors. In some cases, the platform state estimates may include vehicle state data and/or environmental object state data, such as position, orientation, velocity, historical state, semantic information, etc.

At 504, the radar-based perception system registers the data (e.g., radar data) using a global referenced frame to generate a globally registered representation of the radar data. For example, each point or detection within the radar data may be mapped or translated into a space having a global reference frame. In some cases, the global reference frame may be determined or received as part of the prior state estimates in 502.

At 506, the radar-based perception system may store the globally registered representation of the radar data in a cyclic buffer. For example, the globally registered representation may be stored as a sparse points collection having the global reference frame in the buffer. In some cases, the cyclic buffer may be a data structure that has a fixed-size buffer that is connected end-to-end such that new data added to the buffer replaces the oldest data.

At 508, the radar-based perception system may determine if discretized update criteria has been met or exceeded. If the criteria is met or exceed, the process 500 proceeds to 510, otherwise the process 500 returns to 502 and additional radar data is received and added to the cyclic buffer. In some cases, the criteria may be a time period elapsing, a predetermined amount of data stored in the cyclic buffer, a number of agents within the scene, the vehicle exceeding a predetermined velocity, a change in the vehicles direction of travel, etc.

At 510, the radar-based perception system may convert the globally registered representation to a locally registered representation having a local reference frame. For example, the system may utilize the most recent state estimate received as part of 502, any available metadata, a prior state of the scene, any known velocity, etc. to determine a physical location with respect to the global reference and perform one or more translations and/or rotations on the position of individual points to locate each point within the global reference frame.

At 512, the radar-based perception system may input the local reference into a multi-layer perceptron process (or classification operations) to individual regions of the locally registered representation to generate one or more feature vectors per region.

At 514, the radar-based perception system may perform pooling, for the individual regions, on the one or more feature vectors associated with the individual locally registered points. The pooling operations may include a statistical summary over the feature vectors of each bin. For instance, the pooling operation may be a max pooling operation in which a maximum value associated with a feature of the feature vectors associated with a bin is selected to represent the bin. In another example, the pooling operation may be an average pooling operation in which an average value associated with a feature of the feature vectors associated with a bin is selected to represent the bin. In some cases, the pooling operation may be performed per feature value when each feature vector includes multiple values.

At 516, the radar-based perception system performs extracts learned features across a plurality of regions. For example, the radar-based perception system may apply one or more neural networks or other types of machine learning techniques to extract features from the one or more portion of the point cloud representation of the radar data. In some cases, each portion of the point cloud representation may include one or more discretized region or grid location. In one specific instance, a u-net architecture may be implemented. A u-net architecture is a convolutional neural network that is utilized for image segmentation based on detecting valid parts of each convolution without relying on any fully connected layers. It should be understood that, in other example, other types of neural networks may be used.

At 518, the radar-based perception system generates a semantic state-based representation utilizing the extracted learned features. For instance, the radar-based perception system may apply a per pixel class estimation to each of the discretized regions to identify a class of the object as well as instance segmentation to determine a center of an object (e.g., a physical position) and/or if two discretized regions are associated with the same object. In some cases, a network may be applied to generate a neural network head for each desired state value. For instance, a network may determine a class of the object, a location or direction of a center of the object, a velocity, direction of travel, etc.

At 520, the radar-based perception system may generate a sparse detection representation based at least in part on the semantic state-based discretized representation. For example, the semantic state-based point cloud representation (e.g., the grid of features) may be converted to object data that may be used to track objects through a scene and/or output to a planning and/or prediction system. For example, the system may apply nonmaximal suppression, thresholding, Hough voting, connected components, and/or morphological operations, among others.

Figure 6:
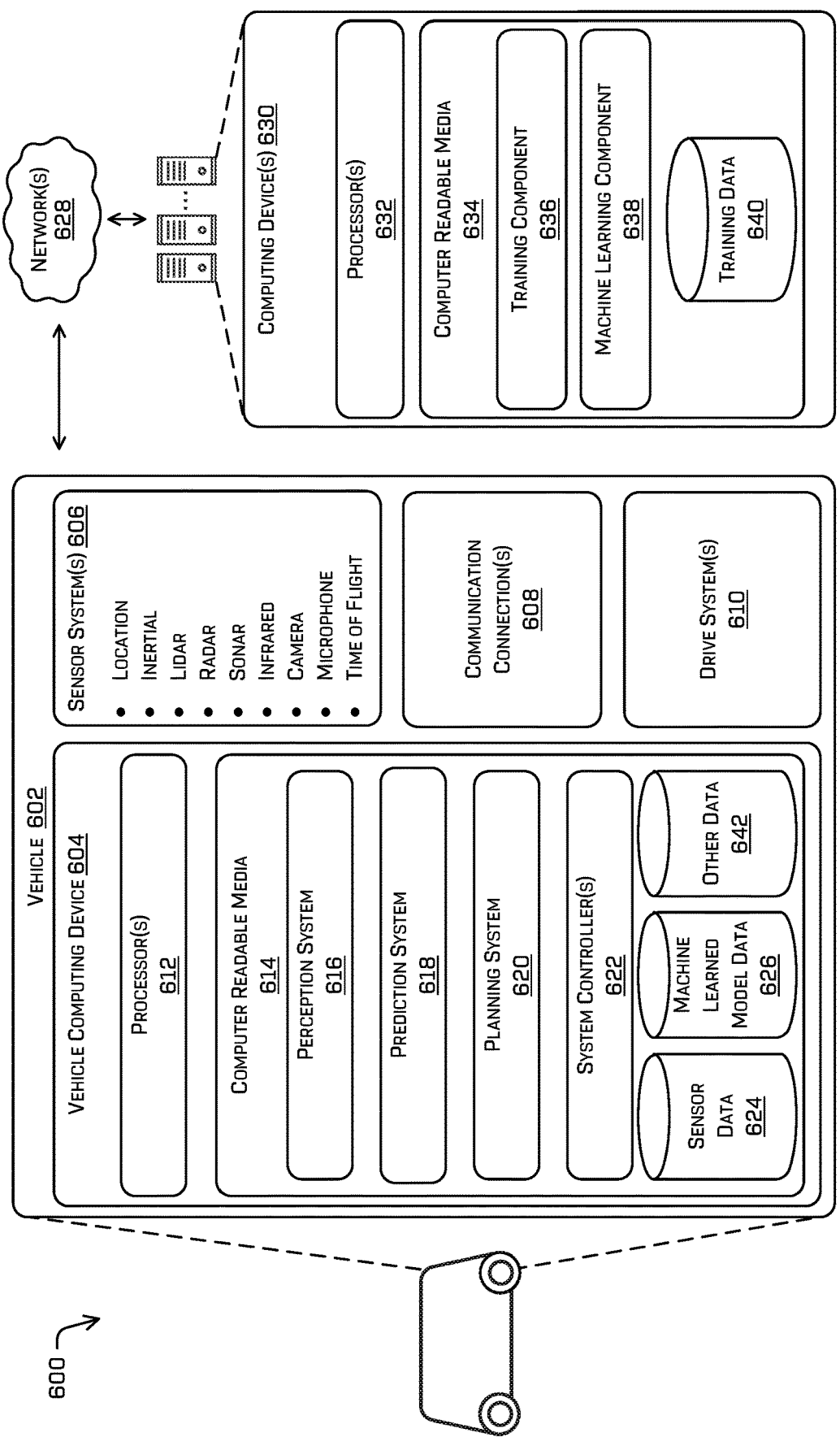
FIG. 6 is a block diagram of an example system for implementing the perception system, as described herein.

FIG. 6 is a block diagram of an example system 600 for implementing the techniques described herein, in accordance with embodiments of the disclosure. In some examples, the system 600 may include one or multiple features, components, and/or functionality of embodiments described herein with reference to FIGS. 1-5. In some embodiments, the system 600 may include a vehicle 602. The vehicle 602 may include a vehicle computing device 604, one or more sensor systems 606, one or more communication connections 608, and one or more drive systems 610.

The vehicle computing device 604 may include one or more processors 612 and computer readable media 614 communicatively coupled with the one or more processors 612. In the illustrated example, the vehicle 602 is an autonomous vehicle; however, the vehicle 602 could be any other type of vehicle, or any other system (e.g., a robotic system, a camera enabled smartphone, etc.). In the illustrated example, the computer readable media 614 of the vehicle computing device 604 stores a perception system 616, a prediction system 618, a planning system 620, one or more system controllers 622 as well as sensor data 624 and other data 642. Though depicted in FIG. 6 as residing in computer readable media 614 for illustrative purposes, it is contemplated that the perception system 616, the prediction system 618, the planning system 620, the one or more system controllers 622 as well as the sensor data 624, machine learned model data 626, and the other data 642, may additionally, or alternatively, be accessible to the vehicle 602 (e.g., stored on, or otherwise accessible by, computer readable media remote from the vehicle 602).

In at least one example, the perception system 616 may be configured to receive sensor data 624 (e.g., radar data) captured during one or more-time interval intervals associated with the sensor system 606. The radar-based perception system 616 may implement both a first update pipeline to generate a global referenced representation of the radar data and a second update pipeline to generate local referenced point cloud representation of the radar data based at least in part on the sensor data 624 and the machine learned model data 626. As discussed above with respect to FIGS. 1-5, the first update pipeline may process radar data collected during a plurality of time intervals and the second update pipeline may then process, for instance periodically or a response to a trigger being met or exceeded, the output of first update pipeline to generate one or more detected instances or object data that may be output to the prediction system 618 and/or the planning system 620.

In some cases, the detected instances or object data may include estimated current, and/or predicted future, characteristics or states of objects (e.g., vehicles, pedestrians, animals, etc.), such as pose, speed, trajectory, velocity, yaw, yaw rate, roll, roll rate, pitch, pitch rate, position, acceleration, or other characteristics, based at least in part on the sparse object state representation output by the perception system 616.

The planning system 620 may determine a path for the vehicle to follow to traverse through the physical environment. For example, the planning system 620 may determine various routes and trajectories and various levels of detail. For example, the planning system 620 may determine a route to travel from a current location to a target location. For the purpose of this discussion, a route may include a sequence of waypoints for travelling between two locations.

In at least one example, the vehicle computing device 604 can include one or more system controllers 622, which can be configured to control steering, propulsion, braking, safety, emitters, communication, and other systems of the vehicle 602. These system controller(s) 622 may communicate with and/or control corresponding systems of the drive system(s) 610 and/or other components of the vehicle 602.

In some instances, aspects of some or all of the components discussed herein can include any models, algorithms, and/or machine learning algorithms. For example, in some instances, components in the computer readable media 614 (and the computer readable media 634, discussed below) such as the perception system 616, the prediction system 618, and/or planning system 620, and may be implemented as one or more neural networks. For instance, the perception system 616 may comprise a machine learned model (e.g., neural network) which has been trained to predict speed, trajectory, and/or other characteristics of a pedestrian (or other object) based on the sensor data 624 and the machine learned model data 626.

In at least one example, the sensor system(s) 606 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), and one or more time of flight (ToF) sensors, etc. The sensor system(s) 606 can include multiple instances of each of these or other types of sensors. For instance, the lidar sensors may include individual lidar sensors located at the corners, front, back, sides, and/or top of the vehicle 602. As another example, the camera sensors can include multiple cameras disposed at various locations about the exterior and/or interior of the vehicle 602. The sensor system(s) 606 may provide input to the vehicle computing device 604. Additionally, or alternatively, the sensor system(s) 606 can send sensor data, via the one or more networks 628, to the one or more computing device(s) at a particular frequency, after a lapse of a predetermined period of time, in near real-time, etc.

The vehicle 602 can also include one or more communication connection(s) 608 that enable communication between the vehicle 602 and one or more other local or remote computing device(s). For instance, the communication connection(s) 608 may facilitate communication with other local computing device(s) on the vehicle 602 and/or the drive system(s) 610. Also, the communication connection(s) 608 may allow the vehicle 602 to communicate with other nearby computing device(s) (e.g., other nearby vehicles, traffic signals, etc.). The communications connection(s) 608 also enable the vehicle 602 to communicate with remote teleoperations computing device or other remote services.

The communications connection(s) 608 may include physical and/or logical interfaces for connecting the vehicle computing device 604 to another computing device (e.g., computing device(s) 630) and/or a network, such as network(s) 628. For example, the communications connection(s) 608 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 610. In some examples, the vehicle 602 may have a single drive system 610. In at least one example, if the vehicle 602 has multiple drive systems 610, individual drive systems 610 can be positioned on opposite ends of the vehicle 602 (e.g., the front and the rear, etc.). In at least one example, the drive system(s) 610 can include one or more sensor systems 606 to detect conditions of the drive system(s) 610 and/or the surroundings of the vehicle 602, as discussed above. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 610. In some cases, the sensor system(s) 606 on the drive system(s) 610 can overlap or supplement corresponding systems of the vehicle 602.

In at least one example, the components discussed herein can process sensor data 624, as described above, and may send their respective outputs, over the one or more network(s) 628, to one or more computing device(s) 630. In at least one example, the components discussed herein may send their respective outputs to the one or more computing device(s) 630 at a particular frequency, after a lapse of a predetermined period of time, in near real-time, etc.

In some examples, the vehicle 602 can send sensor data to one or more computing device(s) 630 via the network(s) 628. In some examples, the vehicle 602 can send raw sensor data 624 to the computing device(s) 630. In other examples, the vehicle 602 can send processed sensor data 624 and/or representations of sensor data (for instance, the object perception tracks) to the computing device(s) 630. In some examples, the vehicle 602 can send sensor data 624 to the computing device(s) 630 at a particular frequency, after a lapse of a predetermined period of time, in near real-time, etc. In some cases, the vehicle 602 can send sensor data (raw or processed) to the computing device(s) 630 as one or more log files.

The computing device(s) 630 may include processor(s) 632 and computer readable media 634 storing a training component 636, a machine learning component 638, as well as training data 640. The training component 636 may generate the training data 640 using the sensor data 624 received from one or more vehicles 602. For instance, the training component 636 may label data representative of an object with one or more measured parameters or characteristics of the object in the sensor data 624. The training component 636 may then use the training data 640 to train the machine learning component 638 to predict motion states of predict current or future speed, trajectory, and/or any other characteristics of objects based on pose of the object depicted in sensor data 624.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 612 of the vehicle 602 and the processor(s) 632 of the computing device(s) 630 may be any suitable processor capable of executing instructions to process data and perform operations as described herein. By way of example and not limitation, the processor(s) 612 and 632 can comprise one or more Central Processing Units (CPUs), Graphics Processing Units (GPUs), or any other device or portion of a device that processes electronic data to transform that electronic data into other electronic data that can be stored in registers and/or computer readable media. In some examples, integrated circuits (e.g., ASICs, etc.), gate arrays (e.g., FPGAs, etc.), and other hardware devices can also be considered processors in so far as they are configured to implement encoded instructions.

Computer readable media 614 and 634 are examples of non-transitory computer-readable media. The computer readable media 614 and 634 can store an operating system and one or more software applications, instructions, programs, and/or data to implement the methods described herein and the functions attributed to the various systems. In various implementations, the computer readable media can be implemented using any suitable computer readable media technology, such as static random-access memory (SRAM), synchronous dynamic RAM (SDRAM), nonvolatile/Flash-type memory, or any other type of computer readable media capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component.

It should be noted that while FIG. 6 is illustrated as a distributed system, in alternative examples, components of the vehicle 602 can be associated with the computing device(s) 630 and/or components of the computing device(s) 630 can be associated with the vehicle 602. That is, the vehicle 602 can perform one or more of the functions associated with the computing device(s) 630, and vice versa. Further, aspects of machine learning component 638 can be performed on any of the devices discussed herein.

Example Clauses

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

A. A system comprising: one or more processors; and one or more non-transitory computer readable media storing instructions executable by the one or more processors, wherein the instruction, when executed, cause the system to perform operations comprising: receiving first radar data captured by a sensor of an autonomous vehicle, the first radar data associated with a first period of time; associating the first radar data with a global reference frame; receiving second radar data captured by the sensor, the second radar data associated with a second period of time; associating the second radar data with the global reference frame; generating a two-dimensional discretized representation from the first radar data and the second radar data, the two-dimensional discretized representation associated with a local reference frame based at least in part on a position the autonomous vehicle in a physical environment and comprising a plurality of discretized regions; for at least one region of the two-dimensional discretized representation, applying a learned function to points of an individual region associated with the region to generate one or more feature vectors associated with the individual region, a feature vector comprising a set of values; for the at least one region of the two-dimensional discretized representation, pooling the one or more feature vectors associated with the individual region to generate an aggregated feature vector associated with the individual region; determining, based at least in part on the aggregate feature vector, object information; and controlling the autonomous vehicle based at least in part on the object information.

B. The system of paragraph A, the operations further comprising: storing the first radar data and the second radar data in a cyclic buffer.

C. The system of paragraph A, wherein the pooling the one or more feature vectors is based at least in part on one of a max pooling operation or an average pooling operation.

D. The system of paragraph A, wherein the object information includes at least one of instance segmentation, object velocity, or object direction of travel.

E. A method comprising: receiving first data captured by a sensor; associating the first data with a global reference frame; generating, based at least in part on the first data and a relationship of a local reference frame to the global reference frame, a two-dimensional data representation; determining, based at least in part on the two-dimensional data representation and a machine learned model, object level data; and controlling an autonomous vehicle based at least in part on the object level data.

F. The method of paragraph E, wherein the first data is associated with a first time, the method further comprising: receiving second data captured by the sensor, the second data associated with a second time after the first time; and associating the second data with the global reference frame.

G. The method of paragraph E, further comprising updating, based at least in part on the second data and the relationship of the local reference frame to the global reference frame, the two-dimensional data representation.

H. The method of paragraph E, wherein first point cloud is stored in a cyclic buffer.

I. The method of paragraph E, wherein generating the two-dimensional data representation further comprises: applying a translation and a rotation to a position of individual points within the global reference frame; generating, for individual regions of the two-dimensional data representation, one or more feature vectors, a feature vector comprising a set of values; and performing, for the individual regions, at least one pooling operation on the one or more feature vectors.

J. The method of paragraph E, wherein determining the object level data further comprises: for individual regions of the two-dimensional data representation, extracting an aggregate feature vector; and determining, based at least in part on the aggregate feature vector, the object level data.

K. The method of paragraph E, wherein determining the object level data is further based at least in part on inputting one or more of an age of the first data or an offset time associated with the first data into the machine learned model.

L. The method of paragraph E, further comprising applying post processing to the object level data prior to controlling the autonomous vehicle.

M. The method of paragraph L, wherein the post processing comprising at least one of: nonmaximal suppression; thresholding; Hough voting; connected components; or morphological operations.

N. The method of paragraph E, wherein: the two-dimensional data representation includes a plurality of regions; a first point of the first data is associated with a first region of the plurality of regions; and a second point of the first data is associated with the first region.

O. A non-transitory computer-readable medium storing instructions that, when executed, cause one or more processors to perform operations comprising: receiving sensor data from a sensor; storing the sensor data in a cyclic buffer; generating, based in part on data stored in the cyclic buffer, a two-dimensional representation having a first region and a second region; inputting at least a portion of the data associated with the first region into a machine learned model; receiving, from the machine learned model, a first set of values; and generating object level data based at least in part on the first set of values.

P. The non-transitory computer-readable medium of paragraph O, further comprising determining one or more criteria has been met or exceed; and wherein generating the two-dimensional representation is in response to the one or more criteria being met or exceed.

Q. The non-transitory computer-readable medium of paragraph P, wherein the one or more criteria includes at least one of: a period of time; a threshold associated with the cyclic buffer; a threshold associated with a sensor used to capture the sensor data; or a detected environmental condition.

R. The non-transitory computer-readable medium of paragraph O, wherein generating the first set of values further comprises: applying a multi-layer perceptron to the at least the portion of the data; receiving a plurality of feature vectors from the multi-layer perceptron; and performing a pooling operation on the plurality of feature vectors to generate, as the first set of values, a first feature vector.

S. The non-transitory computer-readable medium of paragraph O, wherein generating the first set of values is based at least in part on an age of the sensor data and a prior state estimate.

T. The non-transitory computer-readable medium of paragraph O, wherein generating the object level data further comprises applying a neural network to generate one or more learned inferences associated with the first set of values, the operations further comprising: controlling, based at least in part on the one or more learned inferences, an autonomous vehicle.

CONCLUSION

As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 6 may utilize the processes and flows of FIGS. 1-5.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

As a non-limiting example, techniques described herein may be performed, at least in part, by a computing device of an autonomous vehicle, which may receive sensor data and detect one or more objects in an environment and/or determine attributes or object parameters of the one or more objects in the physical environment. Object parameters may comprise velocity, acceleration, position, classification, and/or extents of each of the one or more objects, in addition to any uncertainty information associated therewith. Sensor data captured by the autonomous vehicle may include light detection and ranging (lidar) sensor data, radio detection and ranging (radar) sensor data, sound navigation and ranging (sonar) sensor data, image data, time of flight data, and the like. In some cases, sensor data may be provided to a perception system configured to determine a type of object (e.g., vehicle, pedestrian, bicycle, animal, parked car, tree, building, and the like) in the environment. Further, the out of sequence perception system may determine, based on the sensor data, movement information about the object in the physical environment.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
one or more processors; and
one or more non-transitory computer readable media storing instructions executable by the one or more processors, wherein the instructions, when executed, cause the system to perform operations comprising:
receiving first radar data captured by a sensor of an autonomous vehicle, the first radar data associated with a first period of time;
associating the first radar data with a global reference frame;
receiving second radar data captured by the sensor, the second radar data associated with a second period of time;
associating the second radar data with the global reference frame;
generating a two-dimensional discretized representation from the first radar data and the second radar data, the two-dimensional discretized representation associated with a local reference frame based at least in part on a position of the autonomous vehicle in a physical environment and comprising a plurality of discretized regions, wherein generating the two-dimensional discretized representation comprises:
applying a translation and a rotation to a position of individual points within the global reference frame;
for at least one region of the two-dimensional discretized representation, applying a learned function to points of an individual region associated with the at least one region to generate one or more feature vectors associated with the individual region, a feature vector comprising a set of values;
for the at least one region of the two-dimensional discretized representation, pooling the one or more feature vectors associated with the individual region to generate an aggregated feature vector associated with the individual region;
determining, based at least in part on the aggregate feature vector, object information; and
controlling the autonomous vehicle based at least in part on the object information.

2. The system of claim 1, further comprising storing the first radar data and the second radar data in a cyclic buffer.

3. The system of claim 1, wherein the pooling the one or more feature vectors is based at least in part on one of a max pooling operation or an average pooling operation.

4. The system of claim 1, wherein the object information includes at least one of instance segmentation, object velocity, or object direction of travel.

5. A method comprising:
receiving first data captured by a sensor;
associating the first data with a global reference frame;
generating, based at least in part on the first data and a relationship of a local reference frame to the global reference frame, a two-dimensional data representation, wherein generating the two-dimensional data representation further comprises:
applying a translation and a rotation to a position of individual points within the global reference frame; and
generating, for individual regions of the two-dimensional data representation, one or more feature vectors, a feature vector comprising a set of values;
determining, based at least in part on the two-dimensional data representation and a machine learned model, object level data; and
controlling an autonomous vehicle based at least in part on the object level data.

6. The method of claim 5, wherein the first data is associated with a first time, the method further comprising:
receiving second data captured by the sensor, the second data associated with a second time after the first time; and
associating the second data with the global reference frame.

7. The method of claim 6, further comprising updating, based at least in part on the second data and the relationship of the local reference frame to the global reference frame, the two-dimensional data representation.

8. The method of claim 5, wherein first point cloud is stored in a cyclic buffer.

9. The method of claim 5, wherein generating the two-dimensional data representation further comprises:
performing, for the individual regions, at least one pooling operation on the one or more feature vectors.

10. The method of claim 5, wherein determining the object level data further comprises:
for the individual regions of the two-dimensional data representation, extracting an aggregate feature vector; and
determining, based at least in part on the aggregate feature vector, the object level data.

11. The method of claim 5, wherein determining the object level data is further based at least in part on inputting one or more of an age of the first data or an offset time associated with the first data into the machine learned model.

12. The method of claim 5, further comprising applying post processing to the object level data prior to controlling the autonomous vehicle.

13. The method of claim 12, wherein the post processing comprising at least one of:
nonmaximal suppression;
thresholding;
Hough voting;
connected components; or
morphological operations.

14. The method of claim 5, wherein:
the two-dimensional data representation includes a plurality of regions;
a first point of the first data is associated with a first region of the plurality of regions; and
a second point of the first data is associated with the first region.

15. A non-transitory computer-readable medium storing instructions that, when executed, cause one or more processors to perform operations comprising:
receiving sensor data from a sensor;
storing the sensor data in a cyclic buffer;
generating, based in part on data stored in the cyclic buffer, a two-dimensional data representation having a first region and a second region, wherein generating the two-dimensional data representation further comprises:
applying a translation and a rotation to a position of individual points within a global reference frame; and
generating, for individual regions of the two-dimensional data representation, one or more feature vectors, a feature vector comprising a set of values;
inputting at least a portion of the data associated with the first region into a machine learned model;
receiving, from the machine learned model, a first set of values; and
generating object level data based at least in part on the first set of values.

16. The non-transitory computer-readable medium of claim 15, further comprising:
determining one or more criteria have been met or exceeded; and
wherein generating the two-dimensional representation is in response to the one or more criteria being met or exceeded.

17. The non-transitory computer-readable medium of claim 16, wherein the one or more criteria include at least one of:
a period of time;
a threshold associated with the cyclic buffer;
a threshold associated with a sensor used to capture the sensor data; or
a detected environmental condition.

18. The non-transitory computer-readable medium of claim 15, wherein generating the first set of values further comprises:
applying a multi-layer perceptron to at least the portion of the data;
receiving a plurality of feature vectors from the multi-layer perceptron; and
performing a pooling operation on the plurality of feature vectors to generate, as the first set of values, a first feature vector.

19. The non-transitory computer-readable medium of claim 15, wherein generating the first set of values is based at least in part on an age of the sensor data and a prior state estimate.

20. The non-transitory computer-readable medium of claim 15, wherein generating the object level data further comprises applying a neural network to generate one or more learned inferences associated with the first set of values, the operations further comprising:
controlling, based at least in part on the one or more learned inferences, an autonomous vehicle.

* * * * *